UNITED STATES PATENT OFFICE.

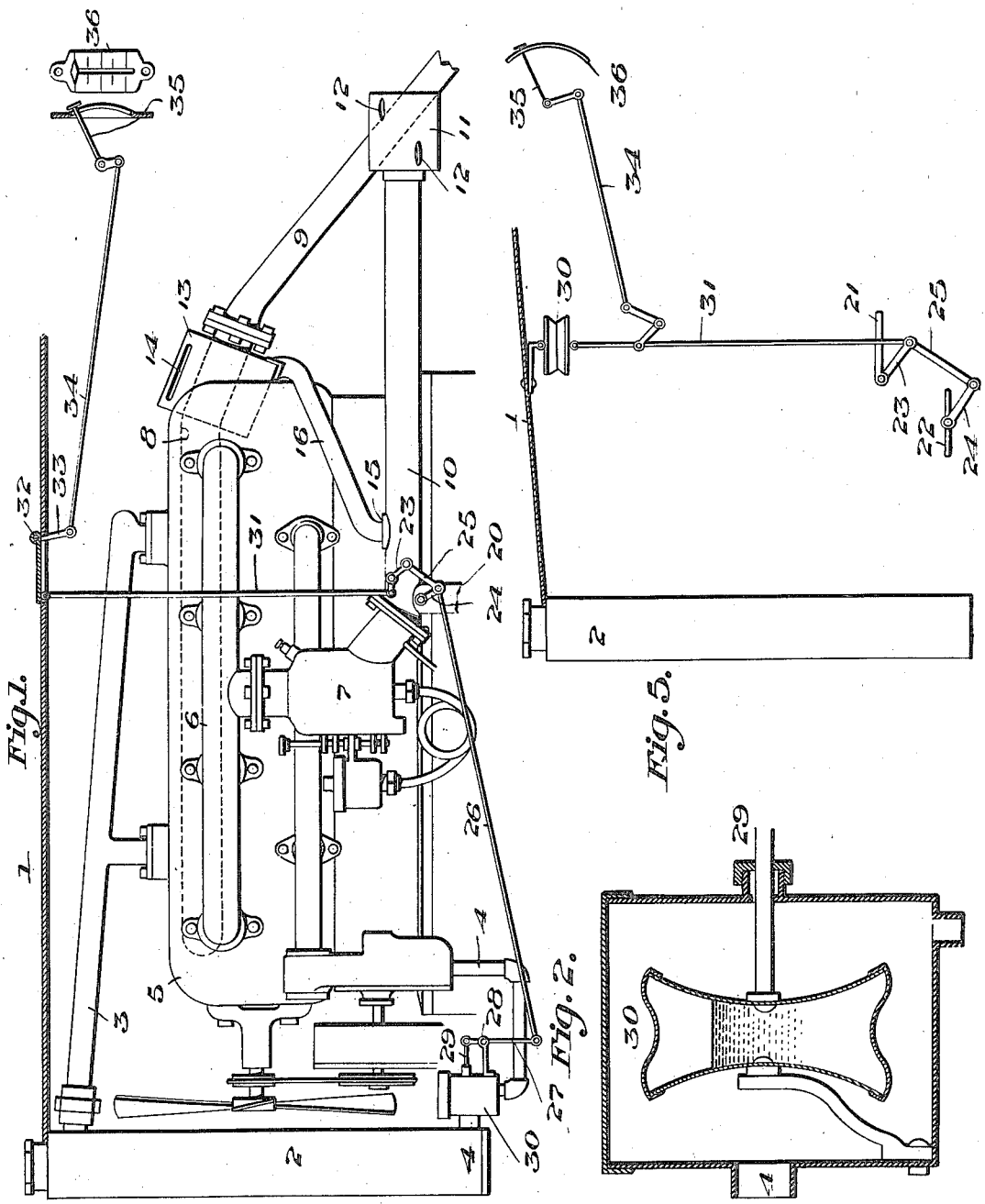

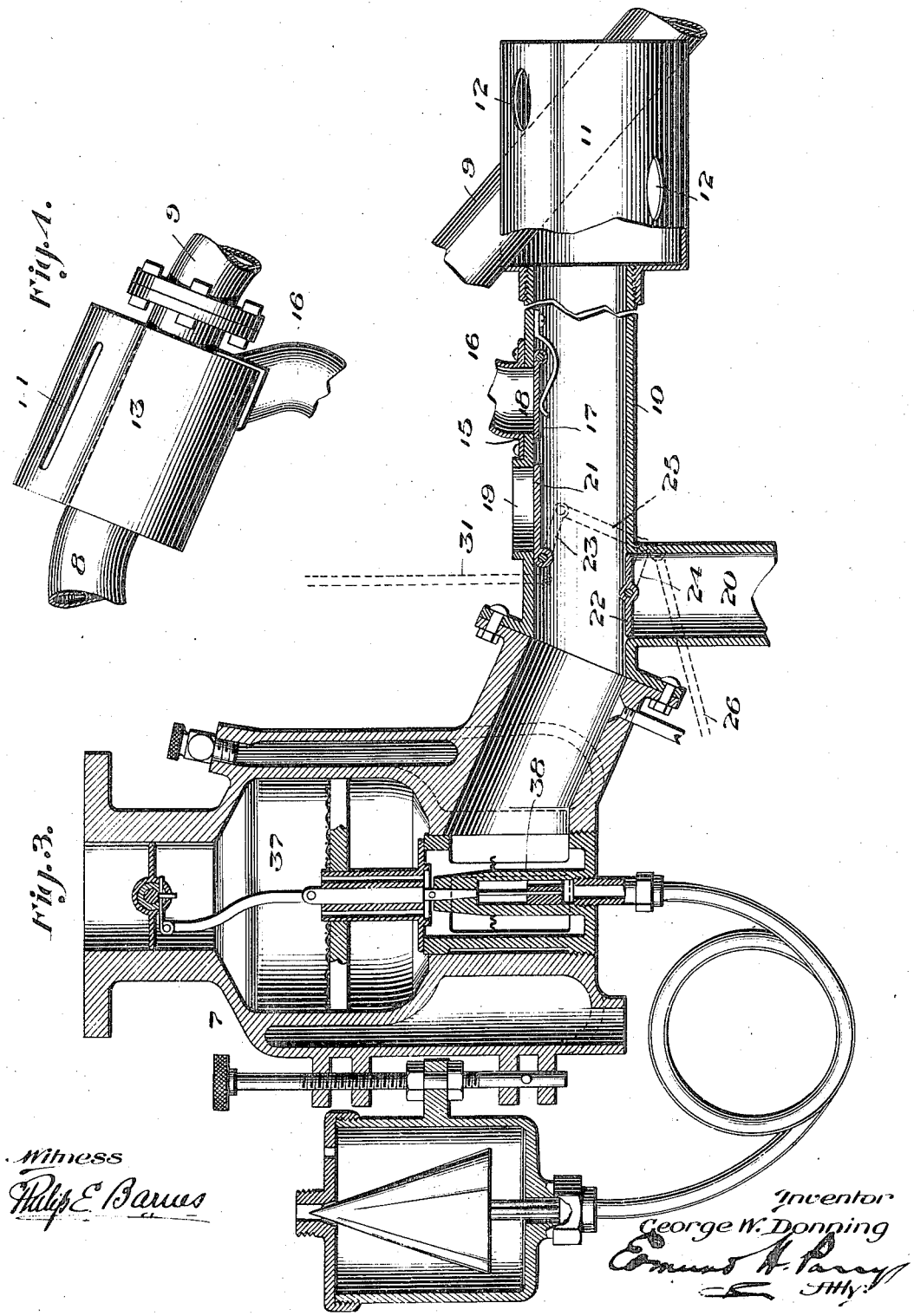

GEORGE W. DONNING, OF STAMFORD, CONNECTICUT, ASSIGNOR TO DONNING CARBURETER CORPORATION, OF ESOPUS, NEW YORK, A CORPORATION OF NEW YORK.

CARBURETER FOR INTERNAL-COMBUSTION MOTORS.

1,242,926.  Specification of Letters Patent.  Patented Oct. 16, 1917.

Application filed June 13, 1916. Serial No. 103,530.

*To all whom it may concern:*

Be it known that I, GEORGE W. DONNING, a citizen of the United States, residing at Stamford, in the county of Fairfield and State of Connecticut, have invented certain new and useful Improvements in Carbureters for Internal-Combustion Motors, of which the following is a specification, reference being had therein to the accompanying drawings.

This invention relates broadly to carbureters and more especially to means for increasing the efficiency thereof, with resultant saving of fuel.

The primary object of the invention is greatly to simplify the construction of a carbureter by eliminating certain adjustable devices and instrumentalities that are usually employed, and, at the same time, to increase its effectiveness and durability; the devices and instrumentalities which I employ being of peculiar construction and effectively correlated to each other; there being also included in the structure means for effecting a heating of the air and fuel utilized to produce a gaseous mixture.

Another object of the invention is to provide efficient means, having a certainty of operation, for predeterminately controlling the proportions and temperature of the air and fuel introduced into the carbureter, whereby they are made to accord with the varying positions of the carbureter throttle.

Another object is to provide for automatically operating the air controlling device within certain and known limits, so that as the degree of suction of the motor drops, the controlling device will naturally assume a new position irrespective of the adjustment of the carbureter throttle, with resultant reduction of the flow of fuel and air into the carbureter, and materially reducing the likelihood of flooding the carbureter; the air controlling device being so related to the carbureter throttle that it can be operated thereby, and the fuel controlling device being so connected to the air controlling device that it, in turn, may be operated in conjunction therewith.

Still another object of the invention is so to relate the fuel controlling device to the air controlling device and carbureter throttle that the fuel controlling device may be adjusted to a nicety that will meet all required working conditions and to accord with varying grades of fuel, and also being adapted for permanent adjustment where required.

Another object is to provide a plurality of air heating devices, one of which is automatically brought into operation when the motor is operating at high speed and the suction developed thereby is, in consequence, materially increased, another of the heating devices operating efficiently, when the speed of the motor drops, with resultant lowering in the suction created thereby, to effect the required heating; these heating devices providing means for tempering the air introduced into the carbureter to produce the required gaseous mixture.

Still another object of the invention is to provide a thermostatically operated device, preferably located within the heating zone of the motor, and influenced by the contents thereof and adapted to govern certain temperature-controlling devices of the carbureter, a hood ventilating device, and a signaling device for indicating to the operator the temperature conditions of the motor, combined with means, within the vision of the operator, for effecting an indication of the relative position any change in the position of the controlling instrumentalities and devices.

Still another object of the invention is to dispose a thermostatic device within the heating zone of the motor and adapted to be influenced by the contents thereof, and so related to the carbureter that the heating of the fluids passing thereinto shall be controlled automatically and efficiently to accord with the varying temperature conditions of the motor; that is to say, when the motor is cold, or comparatively so, the heating of the fluids passing into the carbureter is proportionately increased, whereas, when the motor is hot, or comparatively so, the heating of said fluids is proportionately reduced; in consequence of which ideal conditions are not only created but maintained and the highest efficiency of the motor secured.

The invention, seeking in general to provide a structure (in which, as aforementioned, included instrumentalities, are of simple organization and adapted to meet the requirements of varying climatic, motor and fuel conditions and uses and to have a certainty of action to accomplish the desired results) is from an operative standpoint, effectual at all times, and, functions with little if any regulating after once being adjusted.

Other objects and advantages of the invention will be more or less apparent from the annexed drawings, but will be made entirely clear in the following specification.

In order that the invention may be more readily comprehended, drawings are hereto annexed to illustrate a preferred embodiment thereof; it being understood, however, that the same is capable of a wide range of modification and equivalency and is susceptible of utilization different from that herein revealed.

In these drawings:

Figure 1 is a fragmentary view in sectional elevation of an automobile structure including a motor, a radiator and connections between the same and the motor, a carbureter and connections between the same and the motor, fluid-heating and controlling devices, an inclosing hood, etc., all constructed in accordance with one embodiment of the invention;

Fig. 2 is a view, in section, on an enlarged scale, of a thermostatic device forming a part of the structure;

Fig. 3 is a view, mostly in central vertical longitudinal section, of the structure;

Fig. 4 is a detached view of one of the heating devices shown in Fig. 1; and

Fig. 5 is a view in sectional elevation of a modification.

Referring to these drawings, the reference-numeral 1 designates a hood of an automobile, at one end of which is, in this instance, disposed a radiator 2, forming a part of a water-cooling system which includes connections 3 and 4, respectively, attached to an internal combustion motor 5.

Juxtaposed to the motor and operatively connected thereto, as by an intake manifold 6, is a carbureter 7. Extending from the motor is an exhaust-manifold 8 having an extension 9 leading to a muffler (not shown).

Connecting with the carbureter is an air-conduit 10, of any suitable construction, material and dimensions; the function of this conduit being to convey to the carbureter air which is to combine with fuel in the carbureter to form a gaseous mixture for introduction into the motor.

For the best results, generally, it is desirable to introduce into the carbureter air which has been preheated; and, therefore, I provide means for that purpose. These include a primary heating device 11, provided with apertures 12 and preferably disposed at the end of the conduit 10 and at a point considerably removed from the motor. Extending through the heating device 11 and radiating heat thereinto, is the extension 9 of the exhaust-manifold. It is to be understood that air from the atmosphere is drawn—as by the suction developed through the carbureter by the motor—into the heater 11 through the apertures 12 and is heated therein preparatory to passing through the conduit 10 into the carbureter.

To augment the heating of air by the primary heater 11, I preferably provide a secondary heating-device 13 provided with apertures 14 and connecting, with the conduit 10, at 15, by a duct 16. The secondary heater is disposed in proximity to the motor so as to receive the highest degree of heat from the motor-exhaust; and, to this end, it is herein shown as disposed about the exhaust-manifold 8. This secondary heater is dependent for effective action on a higher degree of suction-action through the carbureter than the primary heater, due to its elevated position; or, as in this instance, there is provided a suction-operated, spring-pressed valve 17 which controls a port 18 in the conduit.

The conduit is provided with a plurality of ports, including the port 18; there being, in this instance, two other ports 19 and 20 which are controlled by valves 21 and 22, respectively, operated by mechanism now to be described. Each of these valves is hinged to the conduit and connected by links 23, 24 and 25 to an actuating-arm 26, which in turn is connected to the end of a thermostatic-lever 27 fulcrumed at 28 and connected to the stem 29 of a thermostatic device 30 which, in this instance, is formed as a part of the extension 4 of the water-cooling system and being, thus, associated with the motor 5 and influenced by its temperature, acts under the influence of varying conditions thereof.

Connecting with the link 23 of the valve-mechanism is an actuating-rod 31 adapted to operate a hood-ventilator 32.

Operatively connected to this ventilator, in this instance, is an arm 33 to which an indicator-actuating rod 34 is pivoted, and to the latter is pivoted a pointer 35 adapted to move over an index-plate 36 mounted on any stationary part of the structure.

Operation: Assuming that the motor is at rest and cold and that the water of cooling system is also cold, the following explanation will make clear the operation of my improved structure: In this condition, the thermostat 30 will be in its contracted position, as shown in Fig. 2; the valves 21 and 22 of the conduit will be closed, and, likewise, the ventilator 32 in the hood; and the indicator-pointer 35 will register this condition on the plate 36. The closed position of the valves 21 and 22 will leave the conduit 10 open to receive heated air from the primary heater 11 as soon as the motor is started at low speed. As soon, however, as the motor has been accelerated, the suction-action developed thereby through the carbureter increases the suction-action through the conduit 10 and, as soon as it is sufficiently great, it will open the valve 17 of port 18 and admit heated air of higher temperature from the secondary heater 13 into the conduit. It is desirable to supplement the primary heater in this way because, when the suction through the conduit 10 has increased, it will draw the air through the primary heater too rapidy to be sufficienty heated. The coöperation of the two heaters, however, creates and maintains a uniform tempering of the air to a predetermined degree, as fixed by the thermostat. The tempered air passes through the conduit 10 into a mixing-chamber 37 in the carbureter and wherein it combines with fuel introduced thereinto through a fuel-nozzle 38 mounted in the carbureter 7, which latter is of novel construction and constitutes the subject-matter of another application filed by me on the 28th day of November, 1916, Serial No. 133,898.

When the conditions of the motor result in the cooling-fluid rising to a certain temperature, predetermined, the thermostat 30 will expand and, by means of the actuating parts 27, 26, and the valve-links, effect an opening (more or less) of the valves 21 and 22. The full opening of the valve 21 completely closes the conduit 10 to the right of this valve and cuts off flow of heated air from the heaters, and permits the escape through the port 19 of any heated air that may then be in that portion of the conduit. As soon as the suction-action through the conduit is sufficiently reduced, the valve 17 will automatically close the port 18. Simultaneously with the closing of the valve 21, the valve 22 is opened to admit air through the port 20 from the atmosphere into the carbureter; hence the gaseous mixture will then be of a lower temperature and, in this condition, is introduced into the motor. While the motor is operating with the described conditions prevailing, these valves will remain open. As soon, however, as the conditions of the motor change and the temperature of the cooling-fluid drops, the valves (under the action of the thermostat) are closed automatically and remain so until the suction-action through the carbureter and conduit 10—due to the higher speed of the motor—again effects action of the secondary heater sufficiently to reëstablish the ideal working conditions already described, whereupon the valves are, in the manner aforementioned, again opened. In other words, when the motor is cold, a gaseous mixture of relatively high temperature is introduced into the motor; and, when the motor itself becomes sufficiently warmed, the gaseous mixture introduced thereinto is of a lower temperature due to the action of the heaters and other devices already described. Thus, the efficiency of the motor is maintained at its highest point, practically from the start. By these means, the motor and carbureter are so correlated that the conditions of the motor control the working, in part, of the carbureter, and, thus, control the temperature of the gaseous mixture (produced in the carbureter) preparatory to its introduction into the motor.

In some instances, where the motor is housed within a hood—as in automobiles—it is desirable to ventilate the hood to admit cool air thereinto and permit escape therefrom of hot air. In my construction, as herein exemplified, this may be accomplished in conjunction with the operation of the conduit-valves 21 and 22; and this is effected through the opening of the ventilator 32 by the connecting-rod 31, as already described.

In Fig. 5, I have shown a modified form of construction, the modification residing in the fact that the thermostatic device 30, in lieu of being located in the cooling system, aforementioned, is disposed so as to be influenced by the contents of the hood as developed by the motor and which, thus, is the active means for influencing the thermostatic device. In this instance, the device is attached to or suspended from the hood or other part, above or adjacent to the motor. The adjunctive parts operated thereby may be the same as those described with reference to the preferred embodiment.

It is to be understood that various kinds and grades of fuel may effectively be employed in conjunction with my structure, including kerosene and the like, the high heat required for kerosene, for instance, being readily provided by the coöperation of the heating devices aforementioned to facilitate vaporization in the carbureter.

From the foregoing, it will be perceived that I have succeeded in devising a structure which is well adapted to achieve the several objects and ends in view and that this structure is simple and compact in form, and permits of its ready application to existing forms of motors.

As many changes can be made in the construction and many widely different embodiments of the invention are possible without departing from the spirit thereof, it is intended that all matter contained in the foregoing description and shown in the accompanying drawings shall be interpreted as illustrative, and that the language employed in the following claims is intended to cover the generic as well as the specific features of the invention.

What I claim is:

1. The combination with an internal combustion motor, of a carbureter connected therewith, a fluid heating device operatively connected to the carbureter and normally active to heat a fluid passing thereinto, a second heating device also operatively connected to the carbureter for heating the fluid passing thereinto, and means juxtaposed to the motor and influenced by the condition thereof for controlling the operation of at least one of the said heating devices.

2. The combination with an internal combustion motor, of a carbureter connected thereto, and a plurality of heating devices connected to the carbureter for heating a fluid passing thereinto and independently operated by the varying suction action developed by the motor through the carbureter.

3. The combination with an internal combustion motor, of a carbureter connected thereto, and a plurality of heating devices, operatively connected to the carbureter, the operation of one of the heating devices being controlled by the normal suction developed by the motor through the carbureter, the operation of another of said heating devices being controlled by a change in the degree of the suction through the carbureter.

4. The combination with an internal combustion motor, of a carbureter connected thereto, a plurality of heating devices connected to the carbureter for heating a fluid passing thereinto and independently operated by the varying suction action developed by the motor through the carbureter, and means juxtaposed to the motor and influenced by the condition thereof for controlling the operation of at least one of said heating devices.

5. The combination with an internal combustion motor, of a carbureter connected thereto, a plurality of heating devices connected to the carbureter for heating a fluid passing thereinto and independently operated by the varying suction action developed by the motor through the carbureter, and thermostatic means juxtaposed to the motor and influenced by the condition thereof for controlling the operation of at least one of said heating devices.

6. The combination with an internal combustion motor, of a carbureter connected thereto, a plurality of heating devices operatively connected to the carbureter, at least one of which heating devices is dependent for action upon a relatively high degree of suction developed by the motor through the carbureter, means connected to the carbureter for controlling the operation of the heating devices, and means juxtaposed to the motor and influenced by the condition thereof for controlling the operation of said controlling means.

7. The combination with an internal combustion motor, of a carbureter connected thereto, a plurality of heating devices operatively connected to the carbureter, at least one of which heating devices is dependent for action upon a relatively high degree of suction developed by the motor through the carbureter, means connected to the carbureter for controlling the operation of the heating devices, and thermostatic means juxtaposed to the motor and influenced by the condition thereof for controlling the operation of said controlling means.

8. The combination with an internal combustion motor, of a carbureter connected thereto, a plurality of heating devices operatively connected to the carbureter for heating a fluid passing thereinto, the operation of at least one of the heating devices being effected by a change in the degree of suction developed by the motor through the carbureter, and means juxtaposed to the motor and influenced by the condition thereof for making said heating device inactive.

9. The combination with an internal combustion motor, of a carbureter connected thereto, and a plurality of heating devices operatively connected to the carbureter, and one of which is farther removed from the motor than another thereof, the operation of both of the heating devices being dependent upon the suction developed by the motor through the carbureter, and the operation of at least one of which heating devices is effected by a change in the degree of said suction.

10. The combination with an internal combustion motor having an exhaust, a carbureter connected with the motor, and a plurality of heating devices operatively connected to the exhaust and deriving heat therefrom, one of the heating devices being disposed more remotely from the motor than another thereof, and at least one of these heating devices being rendered active by a change in the degree of suction action developed through the carbureter by the motor.

11. The combination with an internal combustion motor having an exhaust, a carbureter connected with the motor, a plurality of heating devices operatively connected to the exhaust and deriving heat therefrom, one of the heating devices being disposed more remotely from the motor than another thereof, and at least one of these heating devices being rendered active by a change in the degree of the suction action developed through the carbureter by the motor, and means juxtaposed to and influenced by the condition of the motor for rendering at least one of the heating devices inactive.

12. The combination with an internal combustion motor having an exhaust, a carbureter connected with the motor, and a plurality of heating devices operatively connected to the exhaust and deriving heat therefrom, one of the heating devices being disposed more remotely from the motor than another thereof, and at least one of these heating devices being rendered active by a change in the degree of the suction action developed through the carbureter by the motor, and means juxtaposed to one of said instrumentalities and influenced by the temperature thereof for rendering at least one of said heating devices inactive.

13. The combination with an internal combustion motor having an exhaust, a carbureter connected with the motor, and a plurality of heating devices operatively connected to the exhaust and deriving heat therefrom, one of the heating devices being disposed more remotely from the motor than another thereof, and at least one of these heating devices being rendered active by a change in the degree of the suction action developed through the carbureter by the motor, and thermostatic means juxtaposed to one of said instrumentalities and influenced by the temperature thereof for rendering at least one of said heating devices inactive.

14. The combination with an internal combustion motor, of a carbureter, a fluid heater connected therewith, fluid-controlling mechanism interposed between the carbureter and the heater for controlling the operation of the latter, and automatic means disposed outside of and independent of the carbureter for actuating said controlling mechanism and influenced by the temperature of the motor.

15. The combination with an internal combustion motor, of a carbureter connected therewith, a fluid heater connected with the carbureter, valve mechanism interposed between the carbureter and the heater, and automatic means disposed outside of and independent of the carbureter and influenced by the temperature of the motor for operating said valve mechanism.

16. The combination with an internal combustion motor, of a carbureter connected therewith, a fluid heater connected with the carbureter, fluid-controlling mechanism interposed between the carbureter and the heater, automatic means disposed outside of and independent of the carbureter and influenced by the temperature of the motor for operating said controlling mechanism, and means interposed between the heater and the carbureter for introducing a fluid into the carbureter of a lower temperature than that passing from the heater to the carbureter.

17. The combination with an internal combustion motor, of a carbureter connected therewith, a fluid heater connected with the carbureter and maintained active by a suction action developed through the carbureter by the motor, fluid-controlling mechanism interposed between the carbureter and heater, automatic means disposed outside of and independent of the carbureter and influenced by the temperature of the motor for actuating said controlling mechanism, and means for introducing into the carbureter a fluid of lower temperature than that from the fluid heater whereby said suction action is changed.

18. The combination with an internal combustion motor having an exhaust, a carbureter connected therewith, a plurality of fluid heaters communicating with the exhaust, a conduit connected to the carbureter and common to the heaters, fluid-controlling mechanism co-acting with the fluid heaters for controlling the passage therefrom of a heated fluid, the operation of said controlling mechanism being effected by a variation in the degree of a suction action developed by the motor through the carbureter, automatic means influenced by the temperature of the motor for actuating said controlling mechanism, and means for introducing into the conduit at a point between the heaters and the carbureter a fluid of a lower temperature than that conveyed from the fluid heaters to the carbureter whereby said suction action is automatically changed.

19. The combination with an internal combustion motor, of a carbureter connected therewith, a fluid heater associated with the carbureter, an air conduit connecting the heater and the carbureter and normally in communication with the heater for the free passage of a heated fluid from the heater into the conduit, a second heater associated with the conduit, and means for controlling the passage of a heated fluid from the second heater into the air conduit.

20. The combination with an internal combustion motor, of a carbureter connected therewith, a plurality of fluid heaters, a conduit connecting the heaters and the carbureter, an exhaust connection between the motor and the heaters and independent of the conduits, a valve mechanism for independently controlling the flow of a heated fluid from the heaters, and automatic means influenced by the temperature of the motor for actuating said valve mechanism.

21. The combination with an internal combustion motor, of a carbureter connected therewith, a plurality of fluid heaters, a conduit connecting the heaters and the carbureter and provided with a plurality of ports, an exhaust connection between the motor and the heaters and independent of the conduit, valves for controlling the flow of a heated fluid into the conduit from the heaters, at least one of which valves is operated by a suction action developed through the carbureter by the motor, and means associated with the motor and influenced by the temperature thereof for automatically operating at least one of said valves.

22. The combination with an internal combustion motor, of a carbureter connected therewith, a plurality of fluid heaters, a conduit connecting the heaters and the carbureter and provided with a plurality of ports, valves for controlling the flow of a fluid through said ports, at least one of which valves is operated by a suction action developed through the carbureter by the motor, and means associated with the motor and influenced by the temperature thereof for automatically operating at least one of said valves.

23. The combination with an internal combustion motor, a carbureter connected therewith, a motor cooling system associated with the motor, a fluid heater connected to the carbureter, means influenced by a suction action developed through the carbureter by the motor for controlling the flow of the fluid into the carbureter, and automatic means operatively associated with the cooling system and influenced by the temperature thereof for actuating said controlling mechanism.

24. The combination with an internal combustion motor, a carbureter connected therewith, a motor cooling system associated with the motor, a fluid heater connected to the carbureter, means for controlling the flow of fluid into the carbureter, and automatic means operatively associated with the cooling system and influenced by the temperature thereof for actuating said controlling mechanism.

25. The combination with an internal combustion motor, of a carbureter connected therewith, a fluid heater associated with the carbureter, an air conduit connecting the heater and the carbureter and normally in communication with the heater for the free passage of a heated fluid from the heater into the conduit, a second heater associated with the conduit, means for controlling the passage of a heated fluid from the second heater into the air conduit, and operable by a suction action developed through the carbureter by the motor for releasing into the conduit an additional volume of heated fluid.

26. A carbureter-structure including a carbureter-chamber, means for introducing air and fuel thereinto, means for changing the temperature of the air passing into the chamber, a motor-cooling system associated with the carbureter-chamber, and means influenced by the temperature of the fluid in the system for controlling the action of said temperature-changing means.

27. A carbureter-structure including a carbureter-chamber, means for introducing air and fuel thereinto, means for changing the temperature of the air passing into the chamber comprising an air-heating device provided with ports, and valve-mechanism for controlling the same, a motor-cooling system associated with the carbureter-chamber, and means influenced by the temperature of the fluid in the system for controlling the action of said temperature-changing means.

28. A carbureter-structure including a mixing-chamber, a fuel-nozzle, juxtaposed thereto, a throttle for controlling the outflow of gaseous mixture from the mixing-chamber, a valve in the fuel-nozzle connected to the throttle and operable thereby, an air-conduit connected to the carbureter and provided with ports, valve-mechanism for controlling said ports, a cooling-system associated with said carbureter, a thermostatic-device associated with said cooling-system, and a connection between said thermostatic-device and said valve-mechanism.

29. A carbureter-structure including a mixing-chamber, a fuel-nozzle juxtaposed thereto, a throttle for controlling the outflow of gaseous mixture from the mixing-chamber, a valve in the fuel-nozzle connected to the throttle and operable thereby, an air-conduit connected to the carbureter and provided with ports, valve-mechanism for controlling said ports, a cooling-system associated with said carbureter, a thermostatic-device associated with said cooling-system, a connection between said thermostatic-device and said valve-mechanism, and a heating-box associated with said air-conduit for introducing heated air thereinto.

In testimony whereof I affix my signature in presence of two witnesses.

GEORGE W. DONNING.

Witnesses:
A. D. MEAD,
P. E. CANTRELL.